United States Patent
Ijichi et al.

(10) Patent No.: US 6,273,334 B1
(45) Date of Patent: *Aug. 14, 2001

(54) ELECTRONIC-MONEY REWARDING SYSTEM FOR LOST AND FOUND IC CARD

(75) Inventors: Makoto Ijichi, Yokohama; Shigeyuki Itoh, Zushi; Masaaki Hiroya, Yokohama; Hiroshi Asao, Kashiwa; Naomi Sato; Kei Yonezawa, both of Kawasaki, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/332,881

(22) Filed: Jun. 15, 1999

(51) Int. Cl.[7] .................................................. G06K 5/00
(52) U.S. Cl. ........................................... 235/380; 235/375
(58) Field of Search .................................. 235/380, 379, 235/375, 492; 902/25, 26

(56) References Cited

U.S. PATENT DOCUMENTS

| | | | |
|---|---|---|---|
| 4,271,352 | 6/1981 | Thomas | 235/375 |
| 4,630,201 | 12/1986 | White | 235/379 |
| 4,780,601 | 10/1988 | Vermesse | 235/375 |
| 4,839,504 | 6/1989 | Nakano | 235/379 |
| 4,882,473 | 11/1989 | Bergeron et al. | 235/380 |
| 4,904,851 | 2/1990 | Yukino . | |
| 4,968,873 | 11/1990 | Dethloff et al. . | |
| 5,120,939 | 6/1992 | Clause et al. . | |
| 5,204,663 | 4/1993 | Lee | 340/825.34 |
| 5,221,383 | 6/1993 | Gutman et al. | 235/379 |
| 5,239,166 | 8/1993 | Graves . | |
| 5,434,395 | 7/1995 | Storck et al. . | |
| 5,459,304 | 10/1995 | Eisenmann | 235/380 |
| 5,508,501 | 4/1996 | Fujimoto et al. . | |
| 5,594,233 | 1/1997 | Kenneth et al. | 235/492 |
| 5,696,366 | 12/1997 | Ziarno . | |
| 5,761,309 | 6/1998 | Ohahsi et al. | 380/25 |
| 5,932,859 | * | 5/1997 | Ijichi et al. | 235/380 |

* cited by examiner

Primary Examiner—Karl D. Frech
(74) Attorney, Agent, or Firm—Antonelli, Terry, Stout & Kraus, LLP

(57) ABSTRACT

An electronic-money collecting system is capable of returning a lost IC card used as an 'electronic purse' to the owner of the lost IC card or an institution issuing the lost IC card with a high degree of efficiency without imposing a burden on the lost-IC-card finder or the institution issuing the IC card. When a lost IC card in which money data representing the amount of electronic money stored on the card is found, the found IC card is inserted into a terminal installed at places, such as a banking organization or a public institution. At that time, information read out from the IC card is transmitted to a center by way of a communication line. At the center, a storage unit is searched for information on the legitimate owner of the IC card. owner. The owner of the lost IC card is then notified.

7 Claims, 12 Drawing Sheets

| | | |
|---|---|---|
| 301 | Name | Taro Hitachi |
| 302 | Address | 123 Juji-cho Hitachi-shi |
| 303 | Telephone number | 012-345-6789 |
| 304 | card ID number | 1234-5678 |
| 305 | Wallet ID number | 8888-65 |
| 306 | Password | 1234 |
| 307 | The amount of money | ¥5875 |
| 308 | Money record | 12/01/94 -¥5000  01/01/95 -¥1000<br>03/03/95 -¥3000  04/05/95 +¥7000 |
| 309 | Personal information | Taro Hitachi Tel. 987-654-321<br>08/17/95 Patent patrol |
| 310 | Pseudo password | 1111,2222,3333 |
| 311 | Unauthorized-use wallet ID number | |
| 312 | Password-input count | 0 |
| 313 | Password-input time | |
| 314 | Incorrect-password-input -count upper limit | 3 |

FIG.5

500
IC-card information table

| | | |
|---|---|---|
| 501 | Name | Jiro Hitachi |
| 502 | Address | Kanagawa-ken Yokonama-shi,Midori-ku,123 |
| 503 | Telephone number | 001-022-003 |
| 504 | Card ID number | 999888 |
| 505 | Wallet ID number | 12345 |
| 506 | Password | 5050 |
| 507 | The amount of money | ¥150000 |
| 508 | Account number | 918273645 |
| 509 | Pseudo password | 1111,2222,3333 |

FIG.6

IC-card-finding-record table 600

| | | | |
|---|---|---|---|
| 1 Lost-IC-card finder | Name 601 | Santa Hitachi | Jiro Yamada |
| | Adderss 602 | Juichi-cho Hitachi-shi | Ohta-cho Kawasaki-shi |
| | Telephone number 603 | 666-111-5555 | 333-123-456 |
| | IC-card ID number 604 | 334455 | 123456 |
| | Wallet ID number 605 | WA01234 | WA02345 |
| 2 IC-card loser | Name 610 | Taro Hitachi | Ichiro Suzuki |
| | Address 611 | Juii-cho Hitachi-shi | Kanazawa-ku Yokohama-shi |
| | Telephone number 612 | 012-345-6489 | 123-995-123 |
| | IC-card ID number 613 | 112233 | 453456 |
| | Wallet ID number 614 | WA11234 | WA45365 |
| | Password 615 | 1234 | 5151 |
| | Money data 616 | 5875 | 23850 |
| | Money record 617 | 1/1 +¥5000 | 4/3 +¥10000 |
| | | 2/1 -1000 | 4/7 -1000 |
| | | | |
| | Personal information 618 | Taro Yamada | Hanako Sato |
| | | TEl.012 | 8/19 meeting |
| | Pseudo Password 619 | 1111,2222 | 5155,3131 |
| Center-transmission time 620 | | '94.8.17 15:01 | '94.8.19 9:01 |
| Illegally used wallet ID number 630 | | WA01234 | WA55555 |
| Illegal-Password-input count 640 | | 2 | 0 |
| Password-input time 650 | | 15:05 | 9:03 |

FIG.7

700
Reward-money-rate table

| Amount of money | Rate | Illegal-password-input count | First multiplier | Time interval | Second multiplier |
|---|---|---|---|---|---|
| Less than 100,000 yen | 0.1 | 0 | 1.0 | 2 hours | 1 |
| 100,000 – 500,000 yen | 0.09 | 1 | 0.9 | 4 hours | 0.9 |
| 500,000 – 1,000,000 yen | 0.08 | 2 | 0.7 | 6 hours | 0.8 |
|  |  | 3 | 0.5 |  |  |
|  |  |  |  |  |  |

FIG.8

800
IC-card-revocation-condition table

| Annual-illegal-IC-card-usage-count upper limit | Finding time interval | Maximum number of times a lost IC card can be reported within the finding time interval 802 |
|---|---|---|
|  |  |  |

ELECTRONIC-MONEY REWARDING SYSTEM FOR LOST AND FOUND IC CARD

PRIOR ART

The present invention relates to an electronic-money collecting system which is used for electronically collecting a lost IC card containing electronic money.

BACKGROUND ART

As a system which allows an IC card for recording money data issued by a banking organ to be used as an electronic purse, so far, there has been provided a 'Value Transfer System' disclosed by International Publication No. WO91/16691 (or Japanese Patent Laid-open No. Hei 5-504643). Electronic purses each implemented by an IC card compose the 'electronic-purse' system in conjunction with an account settling means for loading money into an electronic purse and controlling exact calculation. The 'electronic-purse' system electronically loads money data from a bank account into a memory in an IC card, treating the IC card like an 'electronic purse'. In this case, since money (or strictly speaking, money data) stored in the IC card is in actuality neither a bill nor a coin, the term 'electronic money' is used in order to distinguish the money stored in an IC card from a bill or a coin. Money can be transferred from an IC card to another IC card through an account settling means. In a transfer of money, it is not necessary for the user to confirm the transferred money with a banking organ. As a result, the processing to transfer money can be carried out in the same way as transferring cash to another person. In addition, at a banking organ, electronic money can be transferred and drawn as is the case with a cash transaction.

At any rate, in many cases, transaction processing using an 'electronic purse' implemented by an IC card is carried out without the need for confirmation with a banking organ. As a result, when an IC card is lost, the money stored in the IC card is also lost and it is impossible to recover the money stored in the lost IC card unless the IC card itself is found. In addition, even if the lost IC card is found by a third person, the amount of money stored therein is not visible, giving rise to a problem that the probability that the lost IC card is returned to the owner or reported to an institution issuing the IC card or a police station is very low. There has been thus a problem that money stored in an electronic purse is wasted in comparison with cash.

In addition, even if the lost IC card is reported to the institution issuing the IC card, the institution needs to follow a procedure for finding the legitimate owner of the reported IC card and returning the IC card to the owner or re-issuing a new IC card in answer to a request made by the owner of the IC card, giving rise to a problem that loads to be borne by the institution and the owner losing the IC card itself are heavy.

It is thus an object of the present invention to provide an electronic-money collecting system capable of returning a lost IC card serving as an 'electronic purse' to the owner or an institution issuing the lost IC card with a high degree of efficiency without giving a troublesome load to the lost-IC-card finder of the IC issuing institution.

It is another object of the present invention to provide an electronic-money collecting system capable of enhancing the rate of collection of money stored in a lost IC card by giving a finder of the lost IC card a predetermined amount of reward money.

It is a still further object of the present invention to provide an electronic-money collecting system capable of preventing a bad faith finder of a lost IC card from being given a reward money.

SUMMARY OF THE INVENTION

In order to achieve the objects described above, the present invention provides an electronic-money collecting system wherein, as a found IC card having money data or the like recorded is entered to a terminal unit installed at an institution such as a banking organ or a public facility, money stored in the IC card is electronically collected; information read out from the IC card is transmitted to a center apparatus by way of a transmission line; information on the legitimate owner of the IC card such as the address of the owner is used by the center apparatus for automatically searching for the owner; and the owner is notified by a communication means of the processing to collect the IC card. Accompanying the electronic collection of the money, the IC card itself may or may not be physically collected.

As described above, in order to increase the rate of collection, a predetermined amount of reward money is given to a finder of a lost IC card. The reward money is given to a finder of a lost IC card by adding money data corresponding to the reward money to money data stored the IC card of the lost-IC-card finder. For example, when an IC card with an unknown owner is found, the lost-IC-card finder can go to an institution such as a banking organ or a public facility at which a terminal unit is installed, entering the found IC card to the terminal unit. Then, information is read out from the IC card automatically and collection processing is carried out. At the same time, reward money is given to the lost-IC-card finder. When the collection processing has been completed, the owner of the IC card is notified by the communication means of the completion of the collection processing by using a telephone, a letter or an electronic mail. After the notification, the owner of the IC card follows a procedure to get back the amount of money stored in the found IC card. In this case, the reward money given to the finder of the IC card is subtracted from the original amount.

In this way, the electronic-money collecting system is capable of returning or collecting a lost IC card to the owner or an institution issuing the lost IC card with a high degree of efficiency without giving a troublesome load to the finder of the IC card or the institution. Further, since the predetermined amount of reward money is added to money data stored in the IC card of the lost-IC-card finder, the rate of collection or the returning rate can be increased.

It should be noted that, when reward money is to be paid to a finder of a lost IC card, a bad faith person such as a person who stole an IC card of another person may make an attempt to get some reward money by pretending to be a finder of a lost IC card. In order to avoid such a bad faith, the number of times an incorrect password is entered, the ID of equipment used by the bad faith person or other information are recorded. When the incorrect password has been entered a number of times exceeding a predetermined maximum number, the collection processing is terminated and the IC card of the bad faith person is revoked.

BRIEF DESCRIPTION OF THE DRAWINGS

FIG. 5 is a diagram showing a typical detailed structure of IC-card information table 500 stored in a storage unit 51;

FIG. 6 is a diagram showing a typical detailed structure of an IC-card-finding-record table 600 stored in the storage unit 51;

FIG. 7 is a diagram showing details of a reward-money-rate table 700 stored in the storage unit 51;

FIG. 8 is a diagram showing a detailed structure of IC-card-revocation-condition table 800 stored in the storage unit 51;

BEST MODE FOR CARRYING OUT THE INVENTION

Preferred embodiments of the present invention will be described with reference to accompanying diagrams showing the embodiments.

Figure 1:
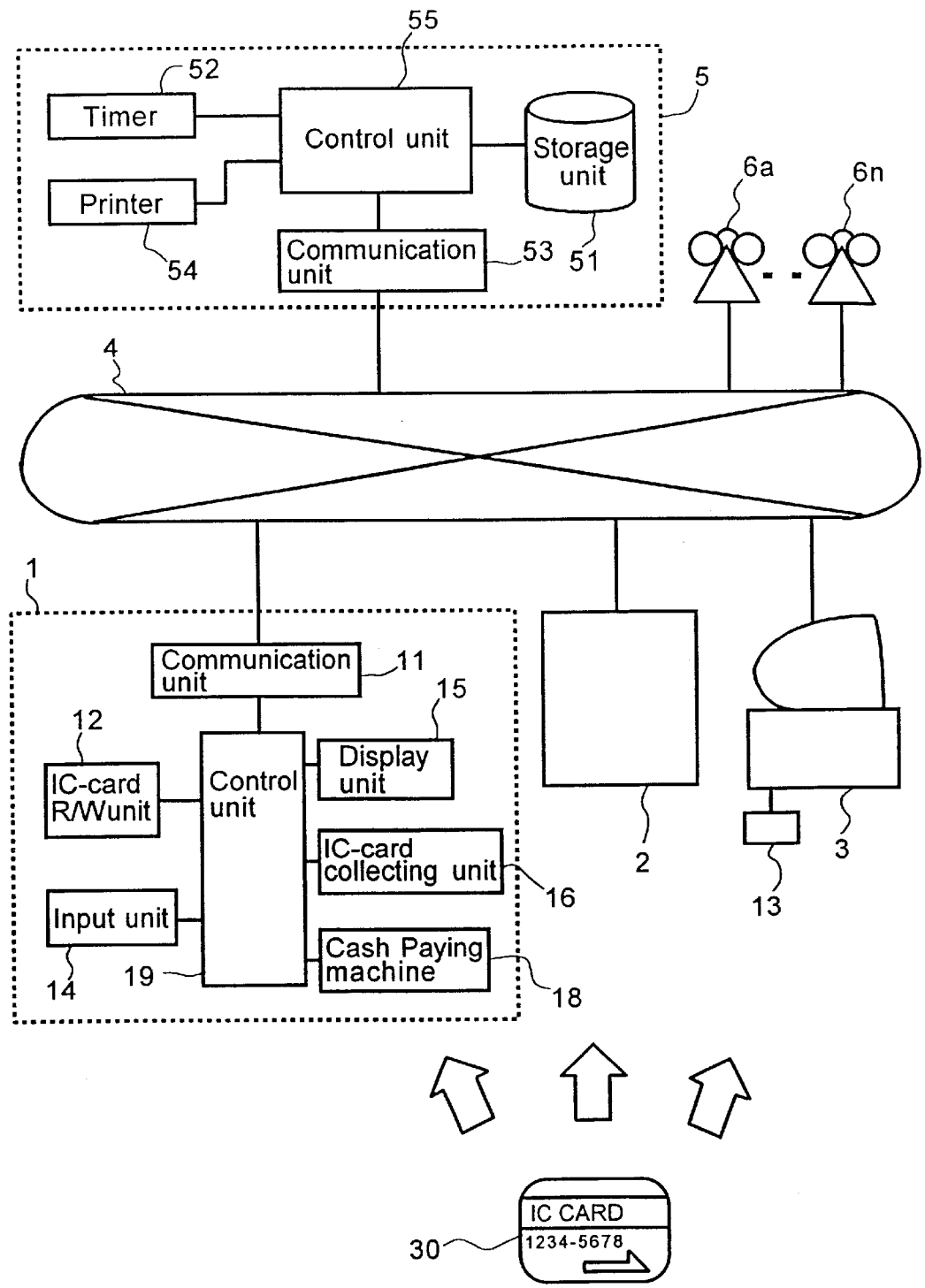
FIG. 1 is a diagram showing the entire configuration of an embodiment implementing an electronic-money collecting system provided by the present embodiment.

FIG. 1 is a diagram showing the entire configuration of an embodiment implementing an electronic-money collecting system provided by the present embodiment. As shown in the figure, the electronic-money collecting system provided by the present embodiment comprises a plurality of terminal units 1, 2 and 3, a center apparatus 5 and a communication line 4 for connecting the terminal units 1, 2 and 3 to the center apparatus 5. A plurality of telephones 6a to 6n are for communicating with owners of IC cards who are called individually from the center apparatus.

In this embodiment, there are provided three different types of terminal unit: terminal units 1, 2 and 3. In FIG. 1, only one unit is installed for each terminal unit type. In actuality, however, a plurality of terminal units can be installed for each type. The terminal unit 1 is typically a dedicated terminal unit installed at a financial institution such as a bank. The terminal unit 1 comprises a communication unit 11 for carrying out communication with the center apparatus 5, an IC-card R/W (read/write) unit 12 for reading out and writing information from and to a memory in an IC card, an input unit 14 such as a keyboard used by the user for entering, among other data, information on the type of usage of the terminal unit, a display unit 15 for showing a variety of messages to the user, an IC-card collecting unit 16 for collecting a found IC card, a cash paying machine 18 for changing electronic money stored in an IC card inserted thereto to cash and paying the cash to the user and a control unit 19 for controlling the whole components constituting the terminal unit 1.

The terminal unit 2 is installed at places like a banking organ, a police station, a public institution such as a city hall, a train station, a school and a department store. Even though a detailed configuration of the terminal unit 2 is not shown in the figure, basically, the terminal unit 2 has the same configuration as the terminal unit 1. Depending upon the place at which the terminal unit 2 is installed, however, the cash paying machine 18 of the terminal unit 1 is omitted from the configuration of the terminal unit 2 to disable cash transactions.

The terminal unit 3 is a terminal unit installed at the home of the owner of an IC card for dedicated use. Typically, the terminal unit 3 is a personal computer equipped with an IC-card R/W unit 13. A detailed configuration of the terminal unit 3 is not shown in the figure. However, the terminal unit 3 has the same configuration as the terminal unit 1 except that the IC-card collecting unit 16 and the cash paying machine 18 are eliminated from the configuration.

The center apparatus 5 comprises a storage unit 51 for storing various kinds of information such as information on owners of IC cards, money transaction record information, information on reward-money rates of reward money to be given to lost-IC-card finders and IC-card-finding-record information of lost-IC-card finders, a timer 52 for computing the present time, a communication unit 53 for carrying out communication with the terminal units 1, 2 and 3 and the telephones 6a to 6n through the communication line 4, a printer 54 for printing a message for use in notifying the owner of a lost IC card that the IC card has been found and a control unit 55 for controlling all the components constituting the center apparatus 5. The center apparatus 5 is typically installed at an institution such as a bank at which the issuance of IC cards is controlled.

The IC card 30 is a medium for storing money data. The IC card 30 is used for electronically storing money data in place of cash. What is stored in the IC card 30 is information indicating the amount of money. Electronic money can be transferred to and from the IC card 30 by entering the IC card to the IC-card R/W unit 12 or 13 of the terminal unit 1, 2 or 3 or to a wallet to be described later.

Figure 2:
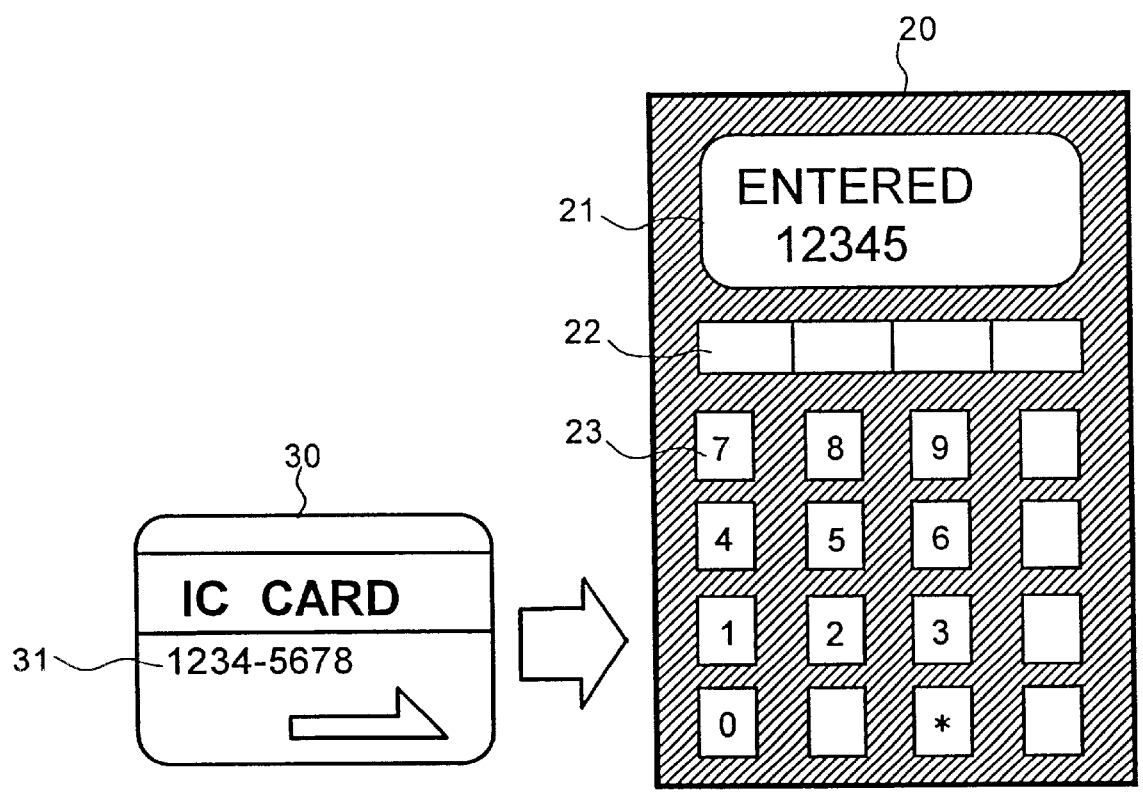
FIG. 2 is a diagram showing external views of an IC card 30 and a wallet 20 used in conjunction with the IC card 30.

FIG. 2 is a diagram showing external views of an IC card 30 and a wallet 20 used in conjunction with the IC card 30. The wallet 20 is used by a person who owns the IC card 30. When the IC card 30 is inserted to the wallet 20, the wallet 20 plays roles of an intermediate means such as confirming the amount of electronic money stored in the IC card 30 and transferring electronic money from an IC card to another. The wallet 20 also controls an operation to lock and unlock electronic money stored in an IC card 30 by means of a lock function which is used for locking electronic money stored in the IC card 30 so that a third person can not check the amount of the electronic money or draw the electronic money from the IC card 30 at his/her own pleasure. The external appearance of the wallet 20 can be made similar to that of a small portable calculator. As shown in the figure, the wallet 20 comprises a liquid-crystal display unit 21, function keys 22, ten-keys 23 and an IC-card insert window which is not shown in the figure.

On the surface of the IC card 30 to be inserted to the wallet 20, various kinds of information such as an ID number 31 of the IC card can be printed if necessary.

Figure 3:
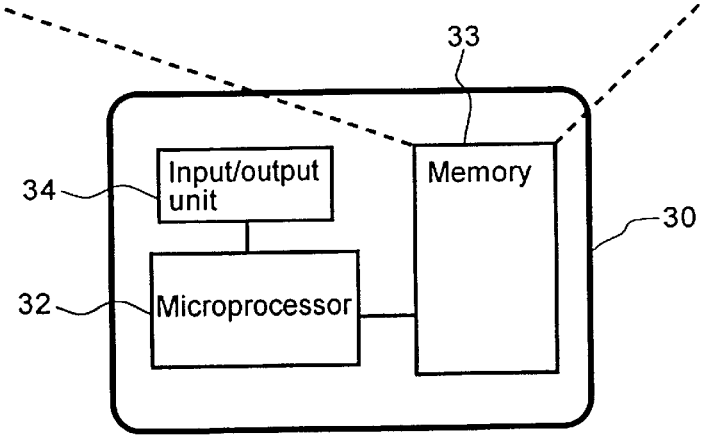
FIG. 3 is a diagram showing the configuration of the IC card 30 and the structure of data stored therein.

FIG. 3 is a diagram showing the configuration of the IC card 30 issued by a banking organ and the structure of data stored therein. An input/output unit 34 is an interface for transferring information to and from an inserted IC card using one of two methods. In one of the methods, information is exchanged electrically by way of contact with a metallic contact point provided on the IC card. The other method is a non-contact method whereby the IC card 31 is inserted into the wallet 20 and information is exchanged in a wireless way between the IC card and the input/output unit 34. In the case of the non-contact method, the protection of information confidentiality can be strengthened by setting the distance from the input/output unit 34 to the IC-card R/W unit 12 at about 0.1 to 10 mm. A memory unit 33 is used for recording the amount of electronic money and a transaction record of money. A non-volatile memory is typically used as the memory unit 33. A microprocessor 32 is used for controlling transfers of information between the input/output unit 34 and the memory unit 33 and operations to produce the transaction record.

As shown in an enlarged form in FIG. 3, the memory unit 33 is used for storing, among other things, information on the legitimate owner of the IC card. The information includes the name 301 of the owner, an address 302, a telephone number 303, an IC-card ID number 304 and a wallet ID number 305 of the wallet owned by the owner of the IC card. In addition, a password 306 is used for transferring electronic money from the IC card. An amount of money 307 is money data on which a transfer of money or an exchange of money is carried out. The amount of money 37 indicates a balance on which a cash settlement can be carried out by using the IC card 30. The amount of money 37 is nucleus information on the electronic money. A money record 308 is used for recording information on transactions made in the past. Personal information 309 is information written and read out personally by the owner of the IC card. The personal information 309 can be used as a memo by the user. The pieces of information 301 to 309 described above are stored for use in electronic-money transactions while other information described below is used for preventing the IC card from being used illegally.

A pseudo password 310 is used for early detecting a third person who makes an attempt to illegally draw electronic money from the IC card. The pseudo password 310 is typically a number which is likely to be suggested to the mind of an unauthorized user. An example of such a number is the birthday or the telephone number of the legitimate user of the IC card. If such a number is entered by a person, the person will be detected as an unauthorized user and processing to collect the IC card 30 will be forcibly carried out. An unauthorized-use wallet ID number 311 is a wallet ID number acquired during an attempt made by an unauthorized user to draw electronic money, that is, the ID of a wallet owned by the unauthorized user. A password-input count 312 is the number of times an incorrect password has been entered. Each time an incorrect password is entered, the password-input count 312 is incremented by one. When a correct password is entered, however, the password-input count 312 is cleared to zero. A password-input time 313 is a most recent time at which a password was entered. An incorrect-password-input-count upper limit 314 is an upper limit of the number of times the IC card allows an incorrect password to be entered consecutively. In the example shown in FIG. 3, the IC card allows an incorrect password to be entered up to 3 times. Thus, when the password-input count 312 is incremented to 4, the operation to draw money from the IC card is terminated.

Figure 4:
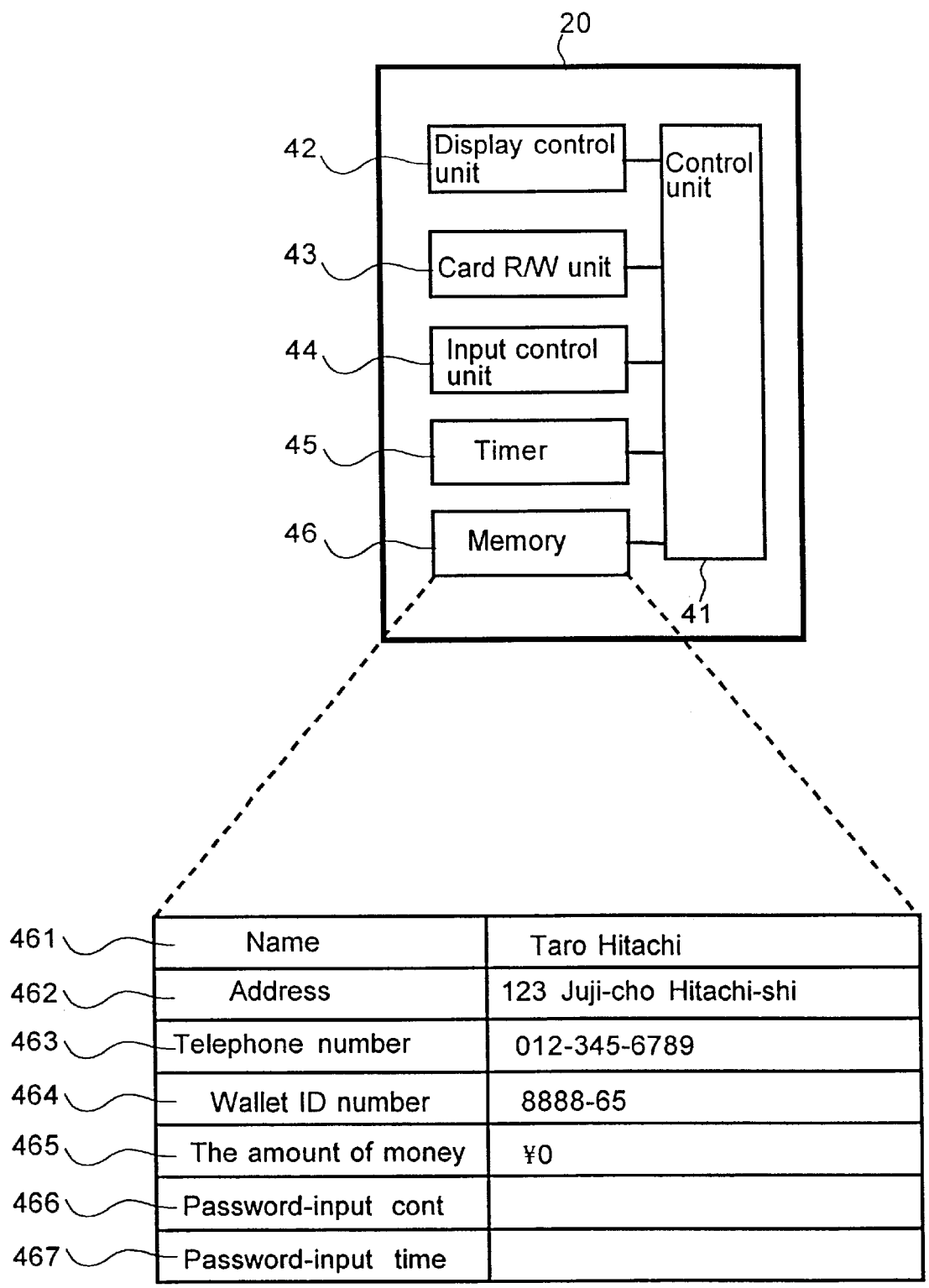
FIG. 4 is a diagram showing the configuration of the wallet 20 and the structure of data stored therein.

FIG. 4 is a diagram showing a detailed configuration of the wallet 20 shown in FIG. 2. A display control unit 42 includes the liquid-crystal display unit 21 shown in FIG. 2. The display control unit 42 is used for displaying various kinds of information such as operation procedures and instructions/guidances to the user. An IC-card R/W unit 43 is used for reading out and writing information from and to the memory unit 33 of an IC card 30 inserted therein. An input control unit 44 which comprises function keys 22 and ten-keys 23 is used for inputting information required for control of the wallet 20. A timer 45 is used for recording a time at which the password of a found IC card 30 was input from the wallet 20. A memory unit 46 is a storage means which is externally accessible. The memory unit 46 is used for storing pieces of information such as the name 461 of the owner of the wallet 20, an address 462, a telephone number 463, a wallet ID number 464, an amount of money 465, a password-input count 466 and a password input time 467, a time at which a password was entered from the input control unit 44 when an attempt was made to use a found IC card 7 illegally. The amount of money 465 recorded in the memory unit 46 is stored temporarily in the wallet 20 from the IC card. A control unit 41 fetches data from the other components, stores the data and controls operations of the other components in accordance with a program stored internally.

Next, details of information stored in a storage unit 51 of the center apparatus 5 are explained by referring to FIGS. 5 to 9. The storage unit 51 includes four tables: an IC card-information table 500, an IC-card-finding-record table 600, a reward-money-rate table 700 and an IC-card-revocation-condition table 800.

FIG. 5 is a diagram showing a typical detailed structure of the IC card-information table 500 stored in the storage unit 51. The IC card-information table 500 contains information on a plurality of IC-card owners. As shown in the figure, the information on each IC-card owner includes the name 501 of the IC-card owner, an address 502, a telephone number 503, an IC-card ID number 504 serving as a unique identification of the IC-card owner, a wallet ID number 505 serving as an ID number of a wallet 20 owned by the IC-card owner, a password 506 for protecting the confidentiality of the IC-card owner, an amount of money 507 left in the account of the IC-card owner, an account number 508 and a pseudo password 509 for avoiding unauthorized use of the IC card. Here, since a transfer of electronic money provided by the present embodiment can be carried out without the need for confirmation with a banking organ, the amount of money 507 is not the amount of money 307 stored in the IC card. Instead, the amount of money 507 is the amount of money in an account in a bank or the like, that is, the amount of money that can be stored in the IC card.

FIG. 6 is a diagram showing a typical detailed structure of the IC-card-finding-record table 600 stored in the storage unit 51 employed in the center apparatus 5. The IC-card-finding-record table 600 contains IC-card-finding-record information on a finder of a lost IC card 30 including the name 601 of the lost-IC-card finder, an address 602, a telephone number 603, the IC-card ID number 604 of the lost-IC-card finder, the wallet ID number 605 of the lost-IC-card finder. The IC-card-finding-record table 600 also contains information on the owner of a lost IC card which was found by the lost-IC-card finder including the name 610, an address 611, a telephone number 612, an IC-card ID number 613, a wallet ID number 614, a password 615, money data 616, a money record 617, personal information 618 and a pseudo password 619 for prevention of unauthorized use of the IC card. Here, the money data 616 corresponds to the amount of money 307 stored in the IC card 30. The IC-card-finding-record table 600 also includes additional information on each lost-IC-card finder such as a center-transmission time 620 at which the finding of the lost IC card was reported to the center, an illegally used wallet ID number 630 used in an attempt to illegally draw electronic money, an illegal-password-input count 640 indicating the number of times an incorrect password has been entered in the attempt to illegally draw electronic money and a password-input time 650 at which the password was entered. In the figure, only two lost-IC-card finders and two IC-card losers are shown. In actuality, however, the storage unit 51 has a recording area for storing a plurality of lost-IC-card finders and IC-card losers.

FIG. 7 is a diagram showing details of the reward-money-rate table 700 stored in the storage unit 51 employed in the center apparatus 5. The reward-money-rate table 700 includes standards used for computing the amount of reward money to be given to a lost-IC-card finder in dependence upon the amount of money 307 recorded in a found IC card 30.

In this example, the amount of money 701 is divided into a plurality of levels. The larger the amount of money 701, the smaller the rate 702. Further stored in the reward-money-rate table 700 is a first multiplier 704 which serves as a first parameter used for changing the rate. The magnitude of the first multiplier 704 is dependent upon an illegal-password-input count 703 indicating the number of times a password has been entered to a wallet 20 in an attempt to illegally use the found IC card. Also stored in the reward-money-rate table 700 is a second multiplier 706 which serves as a second parameter used for changing the rate. The magnitude of the second multiplier 704 is dependent upon the a time interval at which the passwords have been entered. The rate 702 is corrected by multiplying it by the first and second multipliers 704 and 706.

FIG. 8 is a diagram showing a detailed structure of the IC-card-revocation-condition table 800 stored in the storage unit 51. As shown in the figure, the IC-card-revocation-condition table 800 includes an annual illegal-IC-card-usage count upper limit 801 indicating the maximum number of times a found IC card can be reported in one year, a finding time interval 802 and a maximum number of times 803 a found IC card can be reported within the finding time interval 802.

The IC-card-revocation-condition table 800 is provided for limiting the number of misconducts for illegally taking an IC card 30 of another person and illegally receiving reward money for the IC card 30. For example, in the case of a lost-IC-card finder who has found IC cards 30 more than 10 times in a year, the IC card 30 of the lost-IC-card finder itself is revoked in addition to the collection of the found IC cards 30. By the same token, if IC cards 30 are found a number of times exceeding the maximum number of times 803 a found IC card can be reported within the finding time interval 802, the IC card 30 of the lost-IC-card finder itself is revoked in addition to the collection of the found IC cards 30. In this way, a misconduct aimed at collection of reward money can be distinguished from a truly good conduct of finding a lost IC card, allowing the number of misconducts of illegally taking reward money to be limited.

Figure 9:
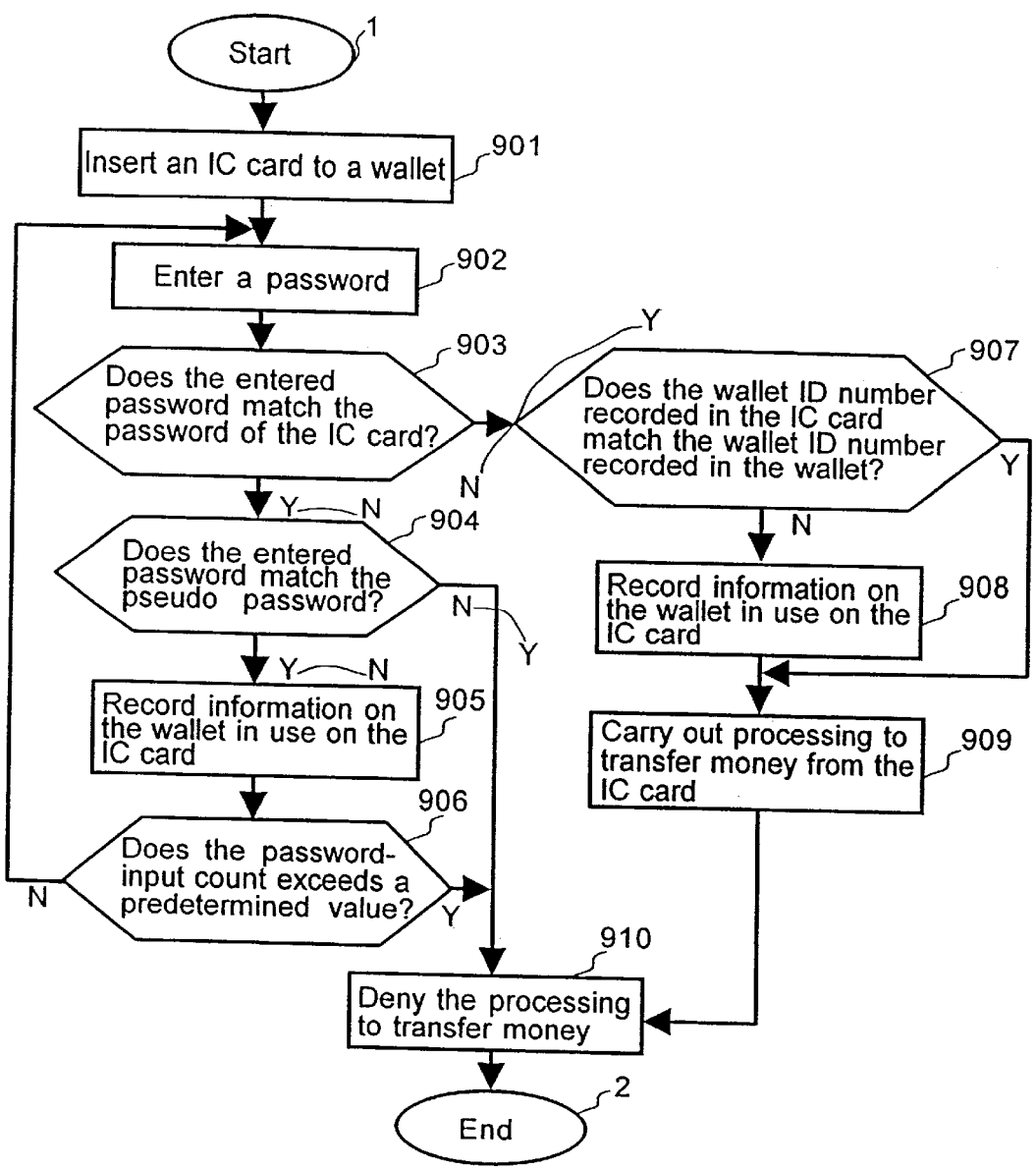
FIG. 9 is a flowchart showing a procedure of money transfer processing using the wallet and the IC card 30.

Next, processing to transfer electronic money from an IC card 30 to another IC card through a wallet 20 is explained by referring to FIG. 9.

As shown in the figure, the processing begins with a step 901 at which the user inserts an IC card 30 to a wallet 20. The processing flow then goes on to a step 902 at which processing to transfer electronic money from an IC card to another is requested by pressing a function key 22. As the function key 22 is pressed, a message saying: "Enter a password" is displayed on the display unit 21 of the wallet 20. In response to the message, the user enters a password. After a password has been entered by the user, the processing flow proceeds to a step 903 at which the microprocessor 32 compares the entered password with a password 306 recorded in the IC card 30 to find out whether or not the former matches the latter.

If the former matches the latter, the processing flow continues to a step 907 at which a wallet ID number 305 of the owner of the IC card recorded in the IC card is compared to a wallet ID number 464 stored in wallet 20 to find out whether or not the former matches the latter. If the former does not match the latter, it is feared that the IC card 30 is used illegally. In this case, the processing flow goes on to a step 908 at which, before the money data 307 recorded in the memory unit 33 of the found IC card 30 and other data are transferred to a transfer-destination IC card, information such as the wallet ID number 464 stored in the wallet 20 is appended to the money data 307 and the information is recorded in the money data 465 of the wallet 20.

If the result of the comparison carried out at the step 907 indicates that the wallet ID number 305 matches the wallet ID number 464, on the other hand, the user who inserted the IC card 30 to the wallet 20 is regarded as the legitimate owner of the IC card 30. In this case, the processing flow goes on to a step 909. At this step, the unauthorized-use wallet ID number 311 of the IC card 30 is cleared whereas the password-input count 312 and the password-input time 313 of the IC card 30 as well as the password-input count 466 and the password-input time 467 of the wallet 20 are reset to zero. A message saying: "Enter the amount of money to be transferred" is then displayed on the display unit 21. In response to this message, the user enters the amount of money to be transferred. Then, the specified amount of money is transferred from the IC card 30 serving as a transfer source to the memory unit 46 of the wallet 20. As the specified amount of money is transferred, the amount of money 465 is increased temporarily. Then, the transfer-source IC card is taken out from the wallet 20 and the transfer-destination IC card is inserted into the wallet 20. The electronic money temporarily transferred to the wallet 20 is then transferred to the memory unit 33 of the transfer-destination IC card 30, completing the processing.

If the result of the comparison carried out at the step 903 indicates that password entered via the ten-keys 23 does not match the password 306, on the other hand, it is feared that the IC card 30 is being used illegally. In this case, the processing flow goes on to a step 904 at which the entered password is compared with the pseudo password 310 that is most likely used by an unauthorized person making an attempt to illegally draw electronic money from the IC card to find out whether or not the former matches the latter. If the entered password matches the pseudo password 310, the user is detected as an unauthorized user instead of the legitimate owner of the inserted IC card. In this case, the processing flow proceeds to a step 910 at which the request to transfer electronic money from the inserted IC card 30 is rejected.

If the result of the comparison carried out at the step 904 indicates that the entered password does not match the pseudo password 310, on the other hand, the processing flow goes on to a step 905 at which: the wallet ID number 464 of the wallet 20 is recorded in the unauthorized-use wallet ID number 311; the number of times an incorrect password has been entered via the ten-keys 23 for the unauthorized use is counted; the count value is recorded in the password-input count 312; and a time at which a password was entered for the first time is obtained from the timer 45 of the wallet 20 and recorded in the password-input time 313.

Then, the processing flow goes on to a step 906 at which the password-input count 312 produced by the wallet 20 is compared with the incorrect-password-input-count upper limit 314 indicating the number of times the IC card allows an incorrect password to be entered consecutively to find out whether or not the former exceeds the latter. If the former has exceeded the latter, the processing flow goes on to the step 910 at which the request to transfer electronic money from the inserted IC card 30 is rejected. If the former has not exceeded the latter, on the other hand, the processing returns to the step 902.

As described above, in this embodiment, at the step 905, the password-input count and the password-input time are stored in the memory 33 of the IC card 30. It should be noted, however, that they can also be stored at areas 466 and 467 respectively of the memory unit 46 employed in wallet 20.

Figure 10:
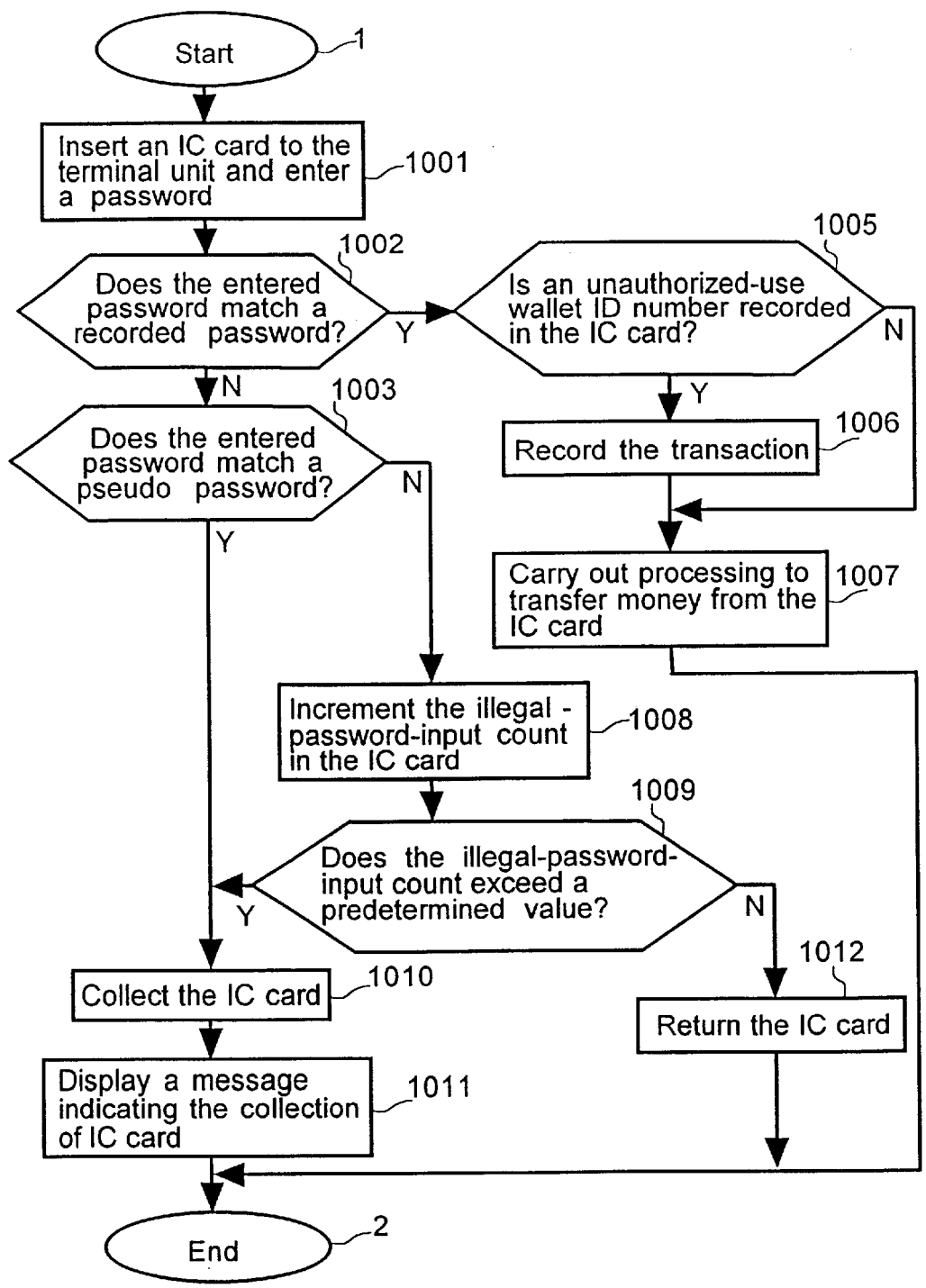
FIG. 10 is a flowchart showing a procedure of money transfer processing using the wallet and the IC card 30 at a terminal unit.

Next, operations which are carried out to render a variety of services using an IC card 30 are explained by referring to a flowchart shown in FIG. 10. Such services include typically conversion of electronic money stored in the IC card 30 into cash by means of a terminal unit 1, a transfer of electronic money to and from the IC card 30 and purchasing of a commodity by using electronic money stored in the IC card 30.

As shown in the figure, the flowchart begins with a step 1001 at which the user inserts an IC card 30 into a terminal unit 1 used by the user and IC-card R/W unit 12 reads out information from the memory unit 33 of the IC card 30. The processing flow then goes on to a step 1002 at which a password 306 read out from the memory unit 33 is compared with a password entered from the input unit 14 to find out whether or not the former matches the latter. At that time, values are set in the password-input time 313 and the password-input count 312 of the IC card 30.

If the former matches the latter, the processing flow proceeds to a step 1005 to find out whether or not an unauthorized-use wallet ID number 311 is recorded in the IC card 30. If an unauthorized-use wallet ID number 311 is not recorded, there is no record indicating that the inserted IC card 30 has been illegally used. In this case, (the processing flow goes on to a step 1007 at which) the password-input time 313 of the IC card 30 is cleared and the password-input count 312 of the IC card 30 is reset to zero prior to the processing to transfer money from the IC card.

If an unauthorized-use wallet ID number 311 is found recorded at the step 1005, on the other hand, the unauthorized-use wallet ID number 311 indicates that the inserted IC card 30 has been illegally used. It is thus quite within the bounds of possibility that this transaction is also unauthorized. In this case, the processing flow goes on to a step 1006 at which transaction information is recorded in a processing record for processing to transfer electronic money. For example, information such as the IC-card ID number 304 stored in the IC card 30 is appended to money data recorded in a host. The information is also recorded in the money data 307 of the found IC card 30 so that the money data 307 includes additional information on a transaction which was done in the past.

Then, the processing flow goes on to the step 1007 at which, after the password-input time 313 of the IC card 30 is cleared and the password-input count 312 of the IC card 30 is reset to zero as described above, the processing to transfer electronic money from the IC card 30 is allowed.

If the comparison carried out at the step 1002 indicates that the password 306 read out from the memory unit 33 does not match the password entered from the input unit 14, on the other hand, it is feared that the IC card 30 is being used illegally. In this case, the processing flow goes on to a step 1003 at which the entered password is compared with the pseudo password 310 that is used for preventing unauthorized use of the IC card to find out whether or not the former matches the latter.

If the former matches the latter, the use of the IC card is considered to be illegal. In this case, the processing flow proceeds to a step 1010 at which the IC card 30 is collected by the IC card collecting unit 16 and put into the terminal unit 1. Then, the processing flow goes on to a step 1011 at which a message explaining a reason why the IC card was collected and a message saying: "Please, visit a window at the IC-card issuing institution" are displayed on the display unit 15, completing the processing.

If the result of the comparison carried out at the step 1003 indicates that the entered password does not match the pseudo password 310, on the other hand, the processing flow goes on to a step 1008 at which the password-input count 312 recorded in the IC card 30 is incremented by one. Then, the processing flow proceeds to a step 1009 at which the password-input count 312 is compared with the annual-illegal-IC-card-usage count upper limit 801 indicating the number of times an IC card has been used illegally so far stored in the IC-card-revocation-condition table 800 shown in FIG. 8. In addition, the IC-card-finding-record table 600 stored in the storage unit 51 is checked to find out whether or not the number of times an IC card has been found within the finding time interval 802 exceeds the maximum number 803.

If the maximum values used as standards are exceeded, the processing flow goes on to the step 1010 at which a signal to collect the IC card 30 is transmitted to the terminal unit 1. The IC card 30 is then collected by the IC card collecting unit 16 and put into the terminal unit 4. The processing flow then goes on to the step 1011 at which a message explaining a reason why the IC card was collected and a message saying: "Please, visit a window at the IC-card issuing institution" are displayed on the display unit 15. If the maximum values are found not exceeded at the step 1009, on the other hand, the processing flow continues to a step 1012 at which the IC card is returned.

Figure 11:
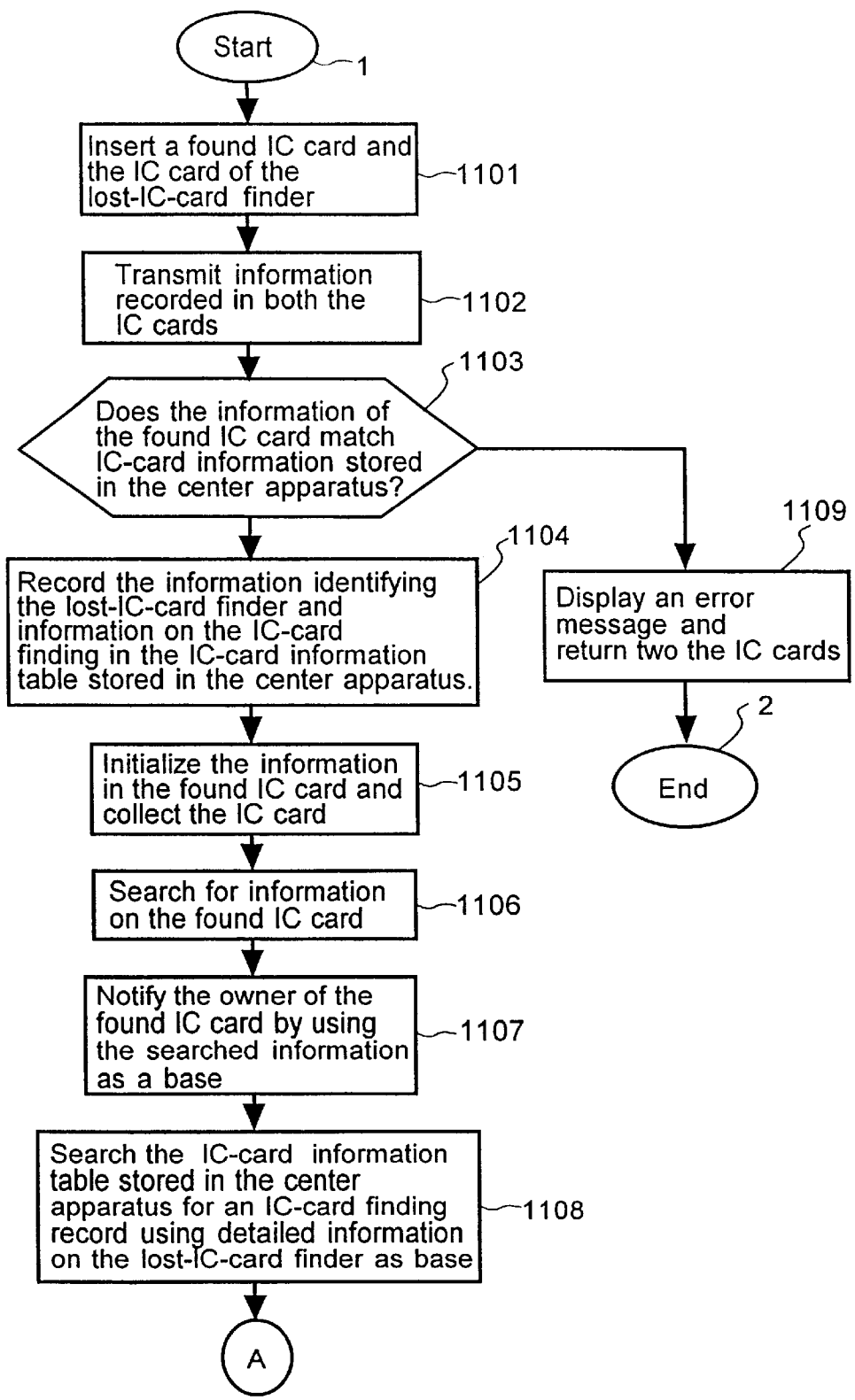
FIG. 11 is a flowchart showing a procedure of operations to collect a found IC card 30 carried out at the terminal unit.
Figure 12:
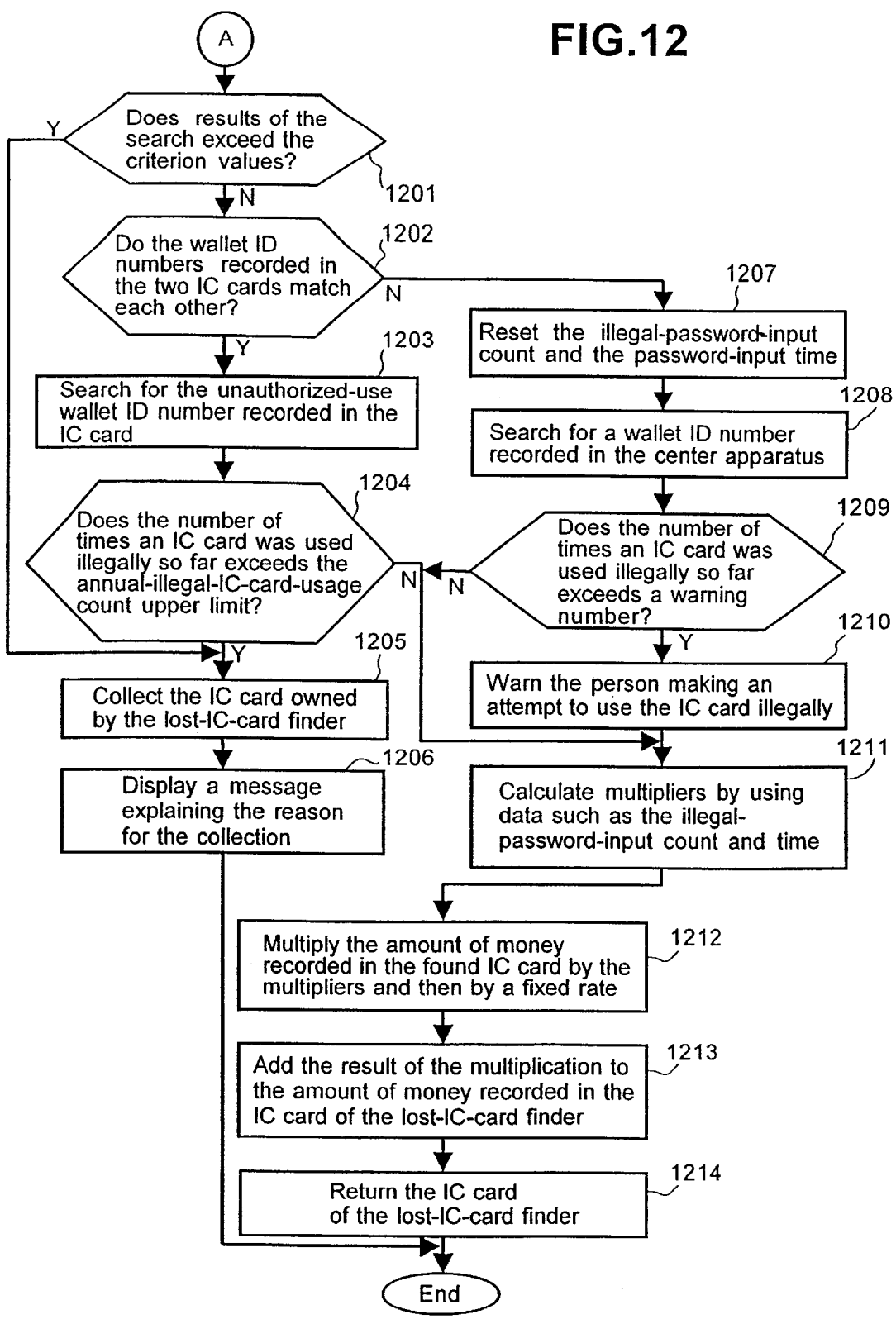
FIG. 12 is a flowchart showing a continuation of that shown in FIG. 11.

Next, operations carried out by the present embodiment to collect a found IC card are explained by referring to a flowchart shown in FIGS. 11 and 12 are explained. The flowchart shows processing to collect a found IC card at the terminal unit 2.

As shown in the figures, the flowchart begins with a step 1101 at which, first of all, a person finding a lost IC card 30 goes to a place at which a terminal unit 2 is installed to return the IC card to the owner. There, as a user of the terminal unit 1, the lost-IC-card finder enter operations to request collection of the found IC card from the input unit 14. The control unit 19 displays a message on the display unit 15 to request the user of the terminal unit 1 (the lost-IC-card finder) that, first, the found IC card 30 be entered to a predetermined insert window and, then, the IC card 30 of the user itself (the lost-IC-card finder itself) be entered to the predetermined insert window. In response to the message, the lost-IC-card finder inserts the IC card 30 of the lost-IC-card finder itself and the found IC card 30 to the IC-card R/W unit 12. It should be noted that an IC card 30 may be locked in order to prevent other persons from drawing or checking electronic money without permission. For this reason, the found IC card 30 which was inserted therein is checked to find out whether or not the IC card 30 is locked. If locked, the control unit 19 automatically unlocks the IC card 30 before carrying out processing to collect the IC card 30. If the IC card 30 is not locked, on the other hand, the control unit 19 transmits information read out by the IC-card R/W unit 12 from the two IC cards, that is, pieces of information denoted by reference numerals 301 to 314 in FIG. 3, to the center apparatus 5 by way of the communication unit 11 and the communication line 4 at the step 1102. In the case of the IC card information of the lost-IC-card finder itself, information for identifying the lost-IC-card finder is enough. It is thus sufficient to transmit only the name 301, the address 302, the telephone number 303, the IC card ID number 304 and the amount of money 307 to the host 5. It should be noted that the lost-IC-card finder may not have an IC card 30. In this case, the lost-IC-card finder can request an employee of a banking organ to carry out operations to collect the found IC card. As an alternative, the lost-IC-card finder can request that a new IC card 30 for the lost-IC-card finder be issued and that processing to collect the found IC card 30 by using the newly issued IC card 30 be carried out.

After the IC-card information of the person who lost an IC card and the finder of the IC card has been received from the terminal unit 1, the processing flow then goes on to a step 1103 at which the control unit 55 of the center apparatus 5 searches the storage unit 51 for the IC-card information table 500 by using information such as the name 301, the address 302, the telephone number 303, the IC card ID number 304 and the password 306 recorded in the found IC card 30 received from the terminal unit 1 as a key in order to find out whether or not information matching theses pieces of information is stored in the storage unit 51.

If a result of the search carried out at the step 1103 indicates that no information stored in the storage unit 51 matches the information received from the terminal unit 1, the found IC card 30 is determined to be an IC card not cataloged in the center apparatus 5, that is, an invalid IC card such as a false IC card or an IC card with the usage thereof invalidated. In this case, the processing flow goes on to a step 1109 at which an error message saying: "This IC card can not be used" is sent to the terminal unit 1 to be displayed on the display unit 15 of the terminal unit 1, and the found IC card as well as the IC card of the lost-IC-card finder itself are returned.

If a result of the search carried out at the step 1103 indicates that information stored in the storage unit 51 matches the information received from the terminal unit 1, that is, the found IC card 30 is recorded in the center apparatus 5, on the other hand, the processing flow proceeds to a step 1104 at which the control unit 55 of the center apparatus 5 records information such as the names 601 and 610 of the finder of the IC card and the person losing the IC card in the IC-card-finding-record table 600. At the same time, the control unit 55 also records the wallet ID number 305 stored in the found IC card 30 into the wallet ID number 630, the unauthorized-use wallet ID number 311 stored in the found IC card 30 into the illegally used wallet ID number 630 used in an attempt to illegally draw electronic money and the password-input count 312 stored in the found IC card 30 into the illegal-password-input count 640 indicating the number of times a password has been entered in the attempt to illegally draw electronic money. In addition, the control unit 55 obtains information on the present time from the timer 52, storing the information as the center-transmission time 620 at which the finding of the lost IC card was reported to the center.

Then, the processing flow continues to a step 1105 at which the control unit 55 of the center apparatus 5 transmits an initialization requesting signal and a collection requesting signal to initialize and collect the found IC card to the terminal unit 2. In response to these signals, the found IC card 30 which was inserted to the IC-card R/W unit 12 is initialized and then the found IC card 30 was collected by the IC card collecting unit 16 into the terminal unit 2. It should be noted that since the collected IC card 30 has been initialized, it can be used as a new IC card.

Then, the processing flow goes on to a step 1106 at which the control unit 55 searches information of the person losing the IC card stored in the IC-card-finding-record table 600 for information for contacting the IC-card loser such as the name 610, the address 611 and the telephone number 612.

The processing flow then goes on to a step 1107 at which the legitimate owner of the IC card is notified that the lost IC card has been found. The owner of the lost IC card can be contacted by an electronic mail if the lost-IC-card owner has a dedicated terminal unit 3. Otherwise, a letter is printed on the printer 54 and sent to the owner through the post or the owner is contacted by the telephone 6a. It should be noted that determination as to whether or not an electronic mail is used is based on the availability of an electronic-mail address in the telephone number 612 of the person losing the IC card in the IC-card-finding-record table 600 shown in FIG. 6.

The processing flow then proceeds to a step 1108 at which the control unit 55 searches the IC-card-finding-record table 600 for the name 601, the address 602, the telephone number 603 and the IC-card ID number 604 of the lost-IC-card finder in order to examine a past record of finding IC cards for the lost-IC-card finder who requested the processing to collect the found IC card, that is, to examine the number of requests for processing to collect a lost IC card made so far and the finding time interval.

The processing flow then continues to a step 1201 at which results of the search operation carried out at the step 1108 are compared with conditions prescribed in the IC-card-revocation-condition table shown in FIG. 8 to find out whether or not the number of requests for processing to collect an IC card made so far exceeds the annual-illegal-IC-card-usage count upper limit 801 of the number of times an IC card can be found in a year and whether or not the number of times an IC card can be found within the finding time interval 802 exceeds the maximum number 803. A number of requests for processing to collect an IC card made so far exceeding the annual-illegal-IC-card-usage count upper limit 801 or a number of times an IC card can be found within the finding time interval 802 exceeding the maximum number 803 is regarded as an indication that it is feared that the lost-IC-card finder has illegally taken the IC card of another person. In this case, the processing flow goes on to a step 1205 at which a collection requesting signal is transmitted to the terminal unit 2 to collect the IC card of the lost-IC-card finder by means of the IC card collecting unit 16. Then, the processing flow continues to a step 1206 at which a message explaining the reason why the IC card was collected and a message saying: "Please, visit a window at the IC-card issuing institution" are displayed on the display unit 15. That is to say, since the number of times the lost-IC-card finder found an IC card so far exceeds the reference value prescribed in the IC-card-revocation-condition table 800, the IC card 30 owned by the lost-IC-card finder itself is also collected and the reason for the collection is also informed to the lost-IC-card finder.

If the number of requests for processing to collect an IC card made so far is found smaller than the annual-illegal-IC-card-usage count upper limit 801 set in the IC-card-revocation-condition table 800 or the number of times an IC card can be found within the finding time interval 802 is found smaller than the maximum number 803 in the same IC-card-revocation-condition table 800 at the step 1201, on the other hand, the processing flow goes on to a step 1202 at which the unauthorized-use wallet ID number 311 recorded in the IC card 30 of the lost-IC-card finder in an attempt to illegally use the IC card 30 is compared with the wallet ID number 305 recorded in the found IC card to find out whether or not the former matches the latter. If the former does not match the latter, the processing flow goes on to a step 1207 at which the password-input count 312 and the password-input time 313 of the found IC card 30 are reset to zero.

Then, the processing flow proceeds to a step 1208 at which the control unit 55 searches the IC-card-finding-record table 600 for the wallet ID number 311 which is recorded in an IC card in an attempt to illegally use the IC card 30. The processing flow then continues to a step 1209 at which a result of the search operation is compared with contents of the IC card-IC-card-revocation-condition table stored in the storage unit 51 to find out whether or not the number of times an IC card was used illegally so far exceeds a warning number. For example, a number of times an IC card was used illegally so far exceeding half the annual-illegal-IC-card-usage count upper limit 801 indicating the number of times an IC card can be used illegally per year indicates that the lost-IC-card finder or the person making an attempt to use the IC card illegally (or the owner of the unauthorized-use wallet ID number 311) did not request processing to collect the IC card immediately. In this case, the processing flow goes on to a step 1210 to give a caution to the lost-IC-card finder or the owner of the unauthorized-use wallet ID number not to use the IC card for other purposes or use the IC card illegally at a DM or similar places. Here, in the warning prior to revocation of the IC card 30 of the lost-IC-card finder, a condition required for giving a caution is set by using half the reference value stored in the IC-card-revocation-condition table 800 as a criterion. As an alternative, a separate warning condition table can also be provided.

If the unauthorized-use wallet ID number 311 recorded in the IC card 30 of the lost-IC-card finder in an attempt to illegally use the IC card 30 is found the same as the wallet ID number 305 recorded in the found IC card at the step 1202, on the other hand, the processing flow goes on to a step 1203 at which the control unit 55 searches the IC-card-finding-record table 600 for the unauthorized-use wallet ID number 311 recorded in the IC card 30 of the lost-IC-card finder in an attempt to illegally use the IC card 30.

The processing flow then proceeds to a step 1204 at which results of the search operation are compared with contents of the IC-card-revocation-condition table 800 to find out whether or not the number of times an IC card was used illegally so far exceeds the annual-illegal-IC-card-usage count upper limit 801 indicating the number of times an IC card can be used illegally per year or the number of times an IC card was found within the finding time interval 802 exceeds the maximum number 803. A number of times the IC card was used illegally so far exceeding the annual-illegal-IC-card-usage count upper limit 801 or a number of times an IC card was found within the finding time interval 802 exceeding the maximum number 803 indicates an attempt made by the lost-IC-card finder to use the IC card illegally and indicates that the lost-IC-card finder did not request processing to collect the IC card immediately. In this case, the processing flow goes on to the step 1205 at which the control unit 55 transmits a collection requesting signal to the IC card collecting unit 16 to collect the IC card 30 inserted in the IC-card R/W unit 12. Then, the processing flow continues to the step 1206 at which a message explaining the reason why the IC card was collected and a message saying: "Please, visit a window at the IC-card issuing institution" are displayed on the display unit 15.

If the comparison of the result of the search operation of the step 1208 with contents of the IC card-IC-card-revocation-condition table 515 carried out at the step 1209 indicates that the collection conditions set in the IC card-IC-card-revocation-condition table 515 are not satisfied, on the other hand, the processing flow goes on to a step 1211 at which the password-input count 312 is extracted from the found IC card 30 and a first multiplier 704 is set from this password-input count 312 and the illegal-password-input count 703 stored in the reward-money-rate table 700 indicating the number of times an illegal password has been entered. In addition, the time interval of the center-transmission time 620 transmitted to the control unit 55 employed in the center apparatus 5 is calculated and a second multiplier 706 is calculated from the time interval.

Then, the processing flow goes on to a step 1212 at which the control unit extracts money data 307 read out from the found IC card 30 and multiplies the money data 307 by a fixed rate 702, the first multiplier 704 and the second multiplier 706.

The processing flow then proceeds to a step 1213 at which the result of the multiplication is added to the amount of money 307 stored in the IC card 30 of the lost-IC-card finder and the result of the addition is transmitted to the terminal unit 2. The control unit 19 of the terminal uses the result of the addition to update the amount of money 307 stored in the memory unit 33 of the IC card 30 of the lost-IC-card finder by means of the IC-card R/W unit 12. In addition, the money data 616 of the IC-card loser is read out from the IC-card-finding-record table 600 and the reward money is subtracted from the money data 616. The result of the subtraction is then recorded as new money data 616. The processing flow then continues to a step 1214 at which an IC card-returning requesting signal is transmitted to an IC card returning unit 47 of the terminal unit 4 in order to return the IC card 30 of the lost-IC-card finder. At the step 1214, the processing is ended.

Figure 13:
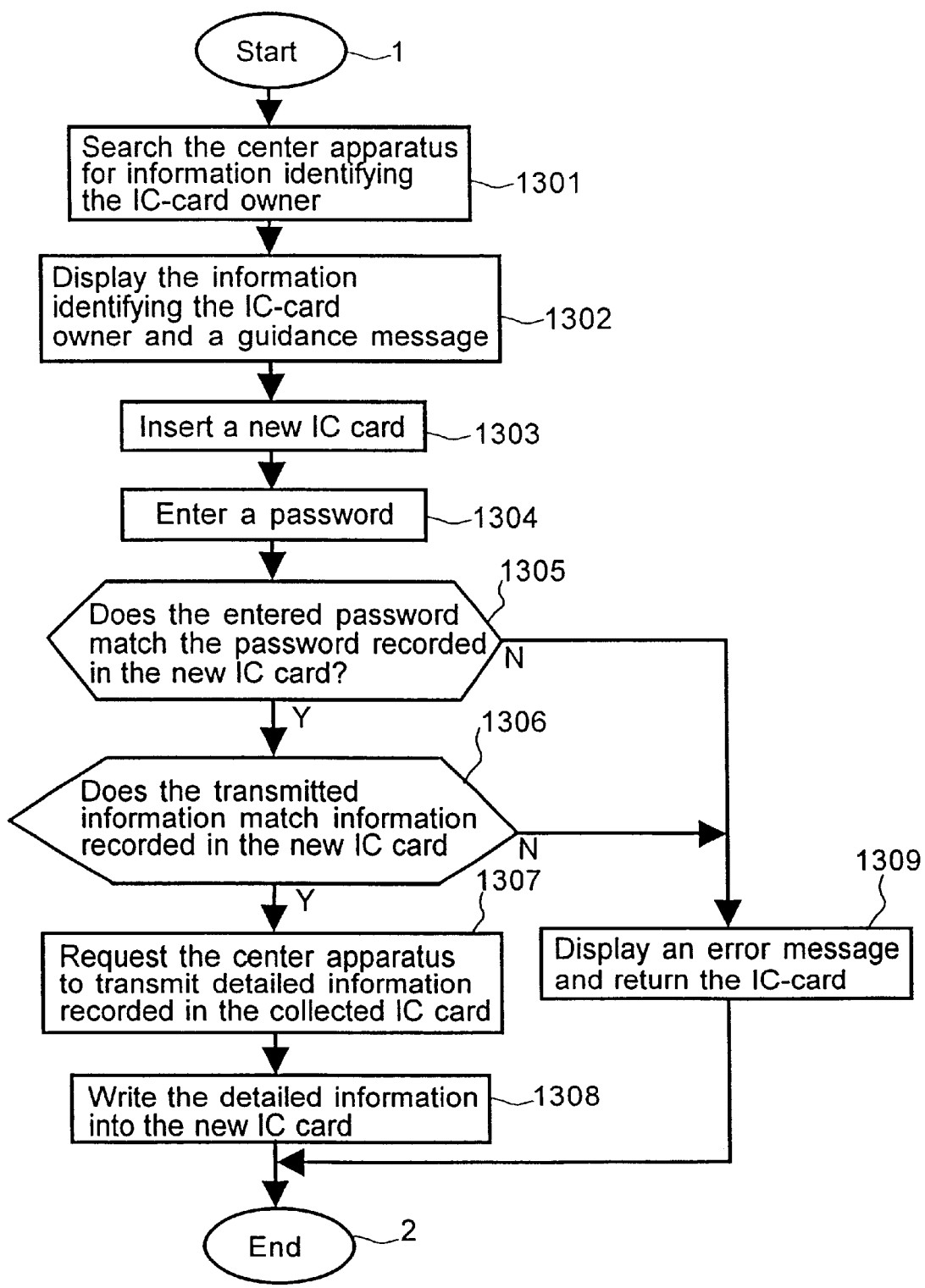
FIG. 13 is a flowchart showing a processing procedure for transferring money data of a found IC card 30 to a new IC card 30.

Next, a processing procedure for used by a person, who is notified that the lost IC card has been found, for transferring the money data stored in the found IC card 30 to a new IC card 30 is explained by referring to a flowchart shown in FIG. 13.

As shown in the figure, the flowchart begins with a step 1301 at which the person, who is notified that the lost IC card has been found, makes a request for a transfer of the money data stored in the found IC card 30 to the new IC card 30 via the input unit 14 at the terminal unit 3 (or the terminal unit 1 or 2). In response to this request, the control unit 19 displays a message on the display unit 15, requesting the person, who is notified that the Lost IC card has been found, that information for identifying the person be entered. The identification information includes the name, the address, the telephone number and the ID number of the owner of the found IC card.

In response to the message, the person who is notified that the lost IC card has been found, enters the name, the address, the telephone number and the ID number of its own to the input unit 14. The control unit 19 then transmits these pieces of information to the center apparatus 5 by way of the transmission line 4.

The center apparatus 5 searches the IC-card-finding-record table 600 for the name, the address, the telephone number and the ID number transmitted thereto. If the name, the address, the telephone number and the ID number are found cataloged in the IC-card-finding-record table 600, the processing flow goes on to a step 1302 at which the name, the address, the telephone number and the ID number and a message saying: "A lost IC card has been collected" are transmitted to the terminal unit 3. The terminal 3 displays the pieces of information and the message on the display unit 15.

The processing flow then proceeds to a step 1303 at which the person who is notified that the lost IC card 30 has been found enters a new IC card to the terminal unit 3. In the new IC card 30, the name, the address, the telephone number, the ID number and a password have been recorded as identification information that can be used for proving that the person is the owner of the lost IC card.

The processing flow then continues to a step 1304 at which the person who is notified that the lost IC card 30 has been found enters a password of its own to the input unit 14 of the terminal unit 3. In this case, the entered password has to be the same as the password set in the lost IC card.

The processing flow then goes on to a step 1305 at which the control unit 19 examines whether or not the password entered via the input unit 14 matches the password cataloged in the new IC card 30. If the passwords do not match each other, the processing flow proceeds to a step 1309 at which an error message saying: "Do the operations once again" is displayed on the display unit 15 and the IC card is returned to the IC-card R/W unit 12.

If the password entered via the input unit 14 matches the password cataloged in the new IC card 30, that is, if the password entered via the input unit 14 is found correct at the step 1305, on the other hand, the processing flow continues to a step 1306 at which the control unit 19 issues a read instruction to the IC-card R/W unit 12, requesting the IC-card R/W unit 12 to read the name, the address, the telephone number, the ID number and the password recorded in the new IC card 30. The name, the address, the telephone number, the ID number and the password read out from the new IC card 30 are then compared with the identification information received earlier from the center apparatus 5. If they do not match each other, the processing flow proceeds to the step 1309 at which the error message saying: "Do the operations once again" is displayed on the display unit 45 and the IC card is returned to the IC-card R/W unit 12.

If the outcome of the comparison carried out at the step 1306 indicates that the name, the address, the telephone number, the ID number and the password read out from the new IC card 30 match the identification information received earlier from the center apparatus 5, on the other hand, the processing flow goes on to a step 1307 at which the control unit 19 requests the center apparatus 5 to transmit the amount of money resulting from the subtraction of the reward money from the amount of money recorded in the found IC card 30, a money record, and a password for unauthorized-use prevention to the terminal 3. When these pieces of information are received from the center apparatus 5, the processing flow continues to a step 1308 at which the control unit 19 writes them into the new IC card 30 by means of the IC-card R/W unit 12.

In this way, information stored in the lost IC card 30 is transferred to the new IC card. It should be noted, however, that the reward money was subtracted from the amount of money.

It is also worth noting that, since the amount of money resulting from the subtraction of the reward money from the amount of money 726 recorded in the found IC card 30 has already been recorded on the IC-card-finding-record table 600, it is not necessary to do subtraction once again.

Finally, the control unit 19 ejects the new IC card 30 containing the updated information, completing the processing.

It should be noted that a person who is notified that the lost IC card has been found via one of the telephones 6a to 6n or a letter through the post may carry out the same operations at a terminal 1 or one of terminals 2a to 2n installed at a banking organ or a public institution.

By the way, if the conditions set in the IC-card-revocation-condition table 800 must be taken into consideration in the collection of an IC card 30 requested by a lost-IC-card finder, a problem may arise in the case of a number of IC cards found at a school or a police station. This is because, in this case, the processing to collect a found IC card is requested by a special person who is typically a responsible person such as a schoolmaster or the chief of the police station. Since the responsible person may request such processing a number of times within a short period of time, the IC card owned by the person inevitably satisfies the revocation condition and is inadvertently revoked by the terminal unit used for requesting the processing.

In order to solve the problem described above, in the case of a responsible person of a facility or an institution at which a number of IC cards may be found, a specific code is added to the IC card 30 of the responsible person so that the IC card 30 is not revoked even if a limit recorded in the IC-card-revocation-condition table 800 is exceeded. As an alternative, an IC-card-revocation-condition table different from the IC-card-revocation-condition table 800 is set separately so that such the problem will not arise. In this way, a responsible person of a facility or an institution at which a number of IC cards may be found can collect a batch of IC cards found in the area under his responsibility.

As described above, in the case of the present embodiment, the rate of reward money is set at a value which varies in dependence upon the amount of money 307 recorded in a found IC card. It should be noted, however, that reward money can always be calculated by using a fixed rate. At any rate, it is possible to adopt any technique for calculating reward money as long as the technique falls within a range allowable by a law or a contract made in conjunction with a banking organ.

In addition, it is possible to cancel the payment of reward money to a person who has received reward money a number of times exceeding a standard reference.

Moreover, it is possible to invalidate and revoke or collect an IC card itself of a person who has collected an IC card a number of times exceeding a standard reference.

Industrial Applicability

As described above, according to the present invention, a lost IC card used as an 'electronic purse' can be returned to the owner of the IC card or to an institution issuing the IC card in a short period of time and with a high degree of efficiency without giving a troublesome load to the lost-IC-card finder, the lost-IC-card owner or the IC-card issuing facility during the work of collecting the lost IC card.

In addition, since a reward is given to a lost-IC-card finder for the contribution thereof to the work of collecting a lost IC card without the need to follow a complex procedure, an increase in IC-card collection rate can be expected.

Moreover, since a collected IC card is initialized and recycled, the IC card can be used repeatedly as a source.

Furthermore, a request for collection processing solely aimed at reward money can be avoided, making it possible to prevent the number of misconducts carried out by unauthorized persons from increasing.

What is claimed is:

1. An IC-card collecting method in an IC-card system, which includes a center computer and a terminal unit connected to said center computer through a communication channel, for carrying out transactions using an IC-card storing identification information for identifying the owner of said IC-card and data used for the transactions, said method comprising the steps of:

receiving a request for collecting an IC-card from an inputting means of said terminal unit;

accepting insertion of a first IC-card to be collected into said terminal unit;

reading out information including said identification information and said data used for the transactions from said first IC-card;

sending information read out from said first IC-card and said request for collecting from said terminal unit to said center computer;

storing said information read out from said first IC-card into a storage medium of said center computer;

identifying, at said center computer, an owner of said first IC-card and way of contact with said owner of said first IC-card on the bases of said identification information; and causing a notification of collection of said first IC-card to be forwarded to said owner of said first IC-card in accordance with said way of contact.

2. An IC-card collecting method according to claim 1, further comprising a step of disabling further use of said first IC-card by said terminal unit.

3. An IC-card collecting method according to claim 2, wherein said disabling step includes a step of initializing information stored in said first IC-card.

4. An IC-card collecting method according to claim 1, further comprising the steps of:

accepting inserting of a second IC-card into a second terminal unit;

transferring, from said center computer to said second terminal unit, at least said data used for the transaction in said information read out from said first IC-card stored in said storage medium; and storing said data used for the transaction into said second IC-card.

5. An IC-card collecting method according to claim 4 herein said transferring step includes steps of determining whether the owner of said second IC-card is the same as the owner of said first IC-card, and transferring said data used for the transaction to said second terminal unit if the owner of the said second IC-card is the owner of said first IC-card.

6. An IC-card system for carrying out transactions using an IC-card storing identification information for identifying the owner of said IC-card and data used for the transactions, said system comprising:

a terminal unit operated by a user for carrying out the transactions, said terminal unit comprising:

an IC-card read/write means for executing processing to read out and write information from and into a memory embedded in said IC-card;

an input means for inputting information on usage classification of said terminal unit itself, said usage classification includes collection classification regarding collection of an IC-card inserted in said IC-card read/write means;

communication means for transmitting information read out from said memory embedded in said IC-card and inputted information received from said input means to a center computer and for receiving information to be written into said IC-card from said center computer; and collection means for collecting an IC-card inserted in said IC-card read/write means and transferring said data used for the transactions stored in said IC-card from said IC-card to said center computer in accordance with a collection instruction transmitted from said center computer;

said center computer, to which said terminal unit is coupled through a communication channel, comprising:

storage means for storing identification information for identifying each IC-card owner;

communication means for receiving information read out from said IC-card and input information received from said input means from said terminal unit and for transmitting information to be written into said IC card to said terminal unit; and collection processing means for interpreting information on usage classification received from said input means and, if said usage classification is collection of IC-card inserted in said IC card read/write means, performing the steps of:

sending said collection instruction to said terminal unit;

storing information inclusive of said data used for the transaction read out from a memory embedded in a IC-card to be collected and transferred from said terminal unit to said storage means;

retrieving contact information of the owner of said IC-card to be collected from said storage means; and causing notification of collection of said IC-card to be collected to be forwarded to said owner of said IC-card to be collected by using said contact information.

7. An IC-card system according to claim 6, wherein said collection means has disabling means for disabling further use of said data used for transactions stored in said IC-card to be collected by way of initializing information stored in said IC-card to be collected.

* * * * *